United States Patent
Tseng et al.

(10) Patent No.: US 11,175,876 B1
(45) Date of Patent: Nov. 16, 2021

(54) SYSTEM FOR IN-VEHICLE-INFOTAINMENT BASED ON DUAL ASYNCHRONOUS DISPLAYS

(71) Applicant: Ford Global Technologies, LLC, Dearborn, MI (US)

(72) Inventors: Fling Tseng, Ann Arbor, MI (US); Aed M. Dudar, Canton, MI (US); Jóhannes Geir Kristinsson, Ann Arbor, MI (US)

(73) Assignee: Ford Global Technologies, LLC, Deerborn, MI (US)

( * ) Notice: Subject to any disclaimer, the term of this patent is extended or adjusted under 35 U.S.C. 154(b) by 0 days.

(21) Appl. No.: 16/921,664

(22) Filed: Jul. 6, 2020

(51) Int. Cl.
| | | |
|---|---|---|
| G06F 3/14 | (2006.01) | |
| B60K 35/00 | (2006.01) | |
| G06N 3/04 | (2006.01) | |
| G06N 3/08 | (2006.01) | |

(52) U.S. Cl.
CPC ............ G06F 3/1423 (2013.01); B60K 35/00 (2013.01); G06N 3/0436 (2013.01); G06N 3/08 (2013.01); *B60K 2370/11* (2019.05); *B60K 2370/152* (2019.05); *B60K 2370/164* (2019.05); *B60K 2370/166* (2019.05)

(58) Field of Classification Search
CPC ...... G06F 3/1423; G06N 3/0436; G06N 3/08; B60K 35/00; B60K 2370/166; B60K 2370/164; B60K 2370/152; B60K 2370/11

See application file for complete search history.

(56) References Cited

U.S. PATENT DOCUMENTS

| | | | |
|---|---|---|---|
| 9,140,568 B2 | 9/2015 | Waite et al. | |
| 9,188,449 B2 | 11/2015 | Biswal et al. | |
| 9,481,326 B2 | 11/2016 | Chatterjee | |
| 9,786,170 B2* | 10/2017 | Roy | G08G 1/096775 |
| 10,065,502 B2* | 9/2018 | Miller | B60K 35/00 |
| 10,351,009 B2* | 7/2019 | Miller | B60W 10/06 |
| 2009/0164473 A1 | 6/2009 | Bauer | |
| 2009/0171529 A1* | 7/2009 | Hayatoma | B60K 35/00 701/36 |
| 2011/0254863 A1* | 10/2011 | Hoshino | G01C 21/36 345/660 |
| 2013/0030645 A1 | 1/2013 | Divine et al. | |
| 2013/0145065 A1* | 6/2013 | Ricci | G07C 5/0833 710/241 |
| 2014/0300494 A1* | 10/2014 | Tseng | B60K 37/06 340/932.2 |

(Continued)

*Primary Examiner* — Amy M Levy
(74) *Attorney, Agent, or Firm* — Brandon Hicks; Kilpatrick Townsend & Stockton LLP

(57) ABSTRACT

Multiple display infotainment systems in vehicles provide various options for drivers and passengers to interact with elements on the multiple displays. Techniques include accessing historical driver information that includes previous or typical driver preferences and actions while operating the vehicle. Driving context information and driver state information are received describing the conditions in and around the vehicle. When a signal indicates that an interactive element should be presented to the driver or a passenger, an adaptive rule-based system uses the contextual information and previous history to determine a score for each interaction element. The score and they type of interaction required by the element are then used to determine a location on the multiple displays for presenting the interactive element.

18 Claims, 9 Drawing Sheets

(56) References Cited

U.S. PATENT DOCUMENTS

| | | | | |
|---|---|---|---|---|
| 2017/0124987 A1* | 5/2017 | Kim | ........................ | B60R 11/04 |
| 2018/0032300 A1* | 2/2018 | Singh | ........................ | B60Q 9/00 |
| 2018/0194359 A1* | 7/2018 | Morimoto | .............. | B60K 35/00 |
| 2019/0213976 A1* | 7/2019 | Rakshit | .................. | B60K 37/02 |
| 2019/0369940 A1* | 12/2019 | Song | ........................ | G09G 5/14 |

\* cited by examiner

SYSTEM FOR IN-VEHICLE-INFOTAINMENT BASED ON DUAL ASYNCHRONOUS DISPLAYS

BACKGROUND

Modern vehicles include infotainment systems including displays that provide information and also serve as human-machine interfaces for inputs by drivers and passengers. In some vehicles, infotainment systems include multiple displays at different locations in the cabin. These displays typically include predefined features for each separate display, and in some cases a large screen may be divided into regions with predefined features displayed at each region. During usage, interacting with certain active screens may be challenging or require the driver to pull their focus away from operation of the vehicle to interact with an active display away from the windshield of the vehicle. Display systems with an enhanced level of usability, convenience, and reduced time required to complete a task will improve comfort for users.

SUMMARY

In some embodiments, techniques for rearranging the placement of an interactive element on a display system as part of an infotainment system in a vehicle. The techniques involve identifying an optimal location for an interactive element on a display system for the particular driver and current situation, and rearranging the placement of elements on the display system to optimally suit the situation and driver. In some embodiments, a system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method, including accessing a database of historical driver behavior information, the historical driver behavior information associated with a driver and describing previous interactions with a display system of a vehicle, the display system including a first display and a second display. The method includes receiving driving context information describing a driving environment and receiving driver state information relating to the driver. The method also includes receiving a signal to present an interactive element on the display system. The method includes providing the driving context information and the driver state information to an adaptive learning system as inputs. The method further includes determining, by the adaptive learning system, a threshold value for the interactive element based on accessibility of the driver to the interactive element. The method also includes determining, by the adaptive learning system (e.g., a predefined logic or learning-based adaptive system), a score for the interactive element of the display system based on the historical driver behavior information, the driving context information, and the driver state information. The method further includes determining, by the adaptive learning system, a location on the first display to present the interactive element based on a determination that the score for the interactive element exceeds the threshold value. The method further includes causing the interactive element to be displayed at the location. Other embodiments of this aspect include corresponding computer systems, apparatus, and computer programs recorded on one or more computer storage devices, each configured to perform the actions of the methods.

Implementations may include one or more of the following features. Optionally receiving interaction type data associated with the interactive element and determining the threshold value based on the interaction type data. Optionally, the location on the first display or the second display being further based on the interaction type data. Optionally, the adaptive rule-based system includes an adaptive learning system and an adaptive neuro fuzzy inference system (ANFIS). Optionally, the adaptive learning system includes a set of interaction rules, a base set of rules, defining locations for interactive elements based on a likelihood of interaction by the driver with the interactive elements. Optionally, the location includes setting the location of the interactive element to the first display based on accessibility of driver interaction with the display system based on a determination that the score for the interactive element exceeds a predetermined threshold value. Optionally, generating a signal to present the interactive element on the display system based on the location. Optionally, the driving context information includes at least one of trip data, trip status information, traffic data, weather data, or route data. Optionally, the driver state information includes data corresponding to a driving style of the driver. Optionally, the driver state information includes data received from a mobile device associated with the driver. Optionally, the data received from the mobile device includes at least one of appointment information or phone call information. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
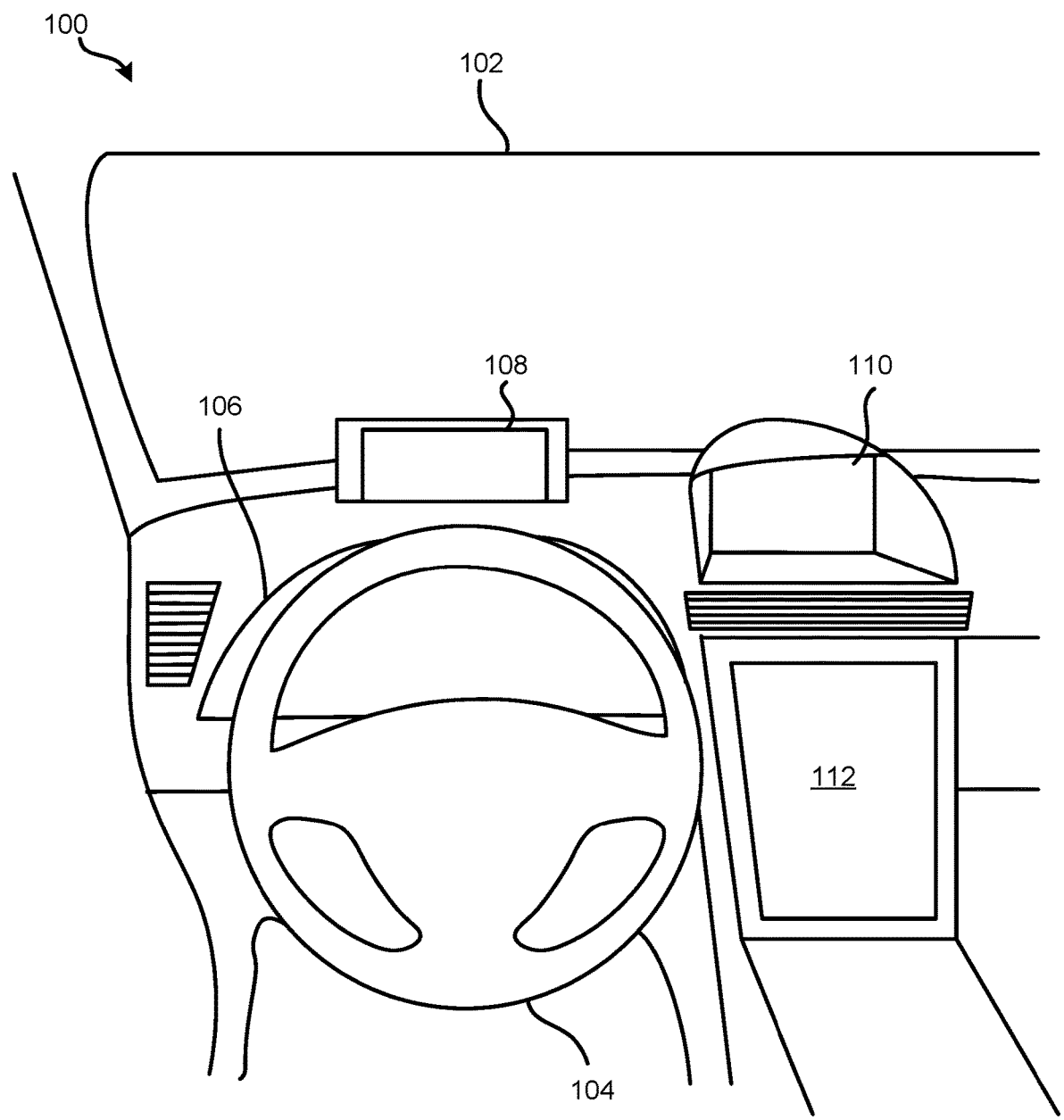
FIG. 1 illustrates a vehicle cab including multiple displays as part of a display system, according to some embodiments.

As discussed above, it is difficult to decide or come up with an exhaustive set of rules to determine where interactive elements are displayed on a multiple display system within a vehicle cab. Interactive elements referred to herein may include the controls or elements used to interact with audio systems, navigation systems, video players, vehicle camera systems, Bluetooth® connectivity systems, universal serial bus (USB) connectivity systems, computer systems, in-vehicle internet, or other such systems controlled operated or otherwise able to be interacted with via an interactive display of a vehicle. Multiple display systems may include one or more displays or screens, such as a light emitting diode (LED), liquid crystal display (LCD), vacuum florescent, plasma display screen, or any other type of display technology. Various interactive elements may be more easily accessed by a driver or a passenger in different locations on the display system. In some examples, different drivers may have different preferences when they operate the vehicle and therefore a single set of rules determining when and where interactive elements are displayed does not account for these preferences. For example, navigation data or directions during a trip may be provided at a display at or near the windshield of the vehicle so as to help the driver keep their eyes and focus forward facing and on the road. At the start of the trip, the navigation element may be presented near the driver, on a display close to the driver for ease of driver interaction and input. Contextual information, such as driver history, traffic data, and weather data, may be used to aid or provide a rule base for an adaptive rule-based system to use to determine a location for the interactive element.

The systems and methods described below may be used to determine where to display and whether to rearrange the placement of interactive elements within a vehicle display system. For example, vehicle systems may include a display system and an adaptive learning system that receives inputs describing a driver state, such as driver identify, driver fatigue, driving style, stress level and other such information as well as driving context information describing trip status information, trip routes, traffic conditions, weather, and other such information. The adaptive learning system, through learning from how user interacted with the display system, may then output a location describing a location on the display system and a score associated with the location. The score may be used to determine where an interactive element is displayed on the display system, for example by selecting the location with the highest associated score.

The systems and methods described herein may be used herein to enhance the usability, convenience, and ease of use of the infotainment system by contextually switching or changing the location of different interaction elements on the display system of the vehicle. The techniques described herein facilitate identifying the relative importance of different interactive elements based on the state of the driver, driving context, and historical driver information. Interactive elements that a driver is likely to interact with may be placed on a display according to how the driver is expected to interact with the element. For example, some interactive elements require inputs from a driver and may therefore be placed closer to the driver while other interactive elements provide instructions or navigation and may be placed near the windshield of the vehicle, for example in a display on the top of the dashboard or a head-up display (HUD). Some interactive elements may be positioned at or near the windshield, in a display further away from the driver, for example to provide navigation directions without directing the focus of the driver away from the road.

Turning to FIG. 1, an exemplary vehicle cab 100 including multiple displays as part of a display system is depicted. The systems and methods described herein use an adaptive rule-based system, such as an adaptive learning system, to determine on which of the multiple displays a particular interactive element should be displayed. The vehicle cab 100 includes a windshield 102 through which a driver views the road and a steering wheel 104 for driving the vehicle. The vehicle cab 100 includes a number of displays as part of a display system. A dashboard display 106 may provide speed, fuel, engine temperature, and other operating information to the driver while driving. An above-dashboard display 108 may provide information and interactive elements to the driver near the windshield 102. The above-dashboard display 108 may provide interactive elements and data to the driver without diverting the attention or focus of the driver away from the windshield during operation of the vehicle. In some examples, the above-dashboard display 108 may include an HUD or other similar display at or near the windshield 102. The above-dashboard display 108 and the dashboard display 106 may each include input mechanisms, such as touchscreens or other such devices.

A center display 110 may be positioned between the driver and the passenger seats in the vehicle cab 100 on the dashboard. The center display 110 is positioned near the windshield 102 similar to the above-dashboard display 108 for preventing diversion of the attention of the driver with interactive elements. In some examples, the center display 110 may include an HUD or a screen, such as described above. The center display 110 may be substantially closer to the driver than the windshield 102 or positioned to either side of the center of the vehicle cab 100. The center display 110 may include a human machine interface, such as a touchscreen or other such input mechanism. A console display 112 may be positioned below the center display 110 between the driver and the passenger seats. The console display 112 may be positioned substantially further from the windshield 102 than the center display 110. The console display 112 may be within accessible reach of the driver and the passenger. The console display 112 may include a human machine interface, such as a touchscreen. The human machine interface may also be positioned in other locations on the console or dashboard and include other input devices, such as selection wheels, buttons, trackpads, or other input devices for controlling one or more of the displays within the vehicle cab 100.

The vehicle cab 100 may also include sensors, such as cameras or other devices to gather information related to the driver while they are operating the vehicle. This information may include a driver identity, driver fatigue, stress levels, and may also include information about the vehicle cab 100 such as the temperature, humidity, lighting conditions, or other states of the vehicle cab 100.

The infotainment system of the vehicle may include, for example, audio, visual, climate control, heating, cooling, navigation, and other such controls that control or cause different systems of the vehicle to change state or act in a prescribed manner as controlled through the infotainment system. Various interactive elements of the infotainment system may be presented on different displays, such as the above-dashboard display 108, dashboard display 106, center display 110, and the console display 112. Interactive elements may include the control systems described above as well as input devices for the driver to control or view at the various displays, such as a screen showing a State of Charge (SOC) which may be of interest for battery-powered electric vehicle drivers when the battery level is reduced to a predetermined threshold.

In some embodiments, there may be a single display with multiple regions, some closer and some further away from the driver. The systems and methods described herein may determine or provide locations for interactive elements on the single display in different regions of the single display screen.

In an example, a user may enter a vehicle cab 100 to begin operation of the vehicle on a particular route. Sensors within the vehicle cab 100 may detect information used to identify the driver. The driver identity may be used to select data from a data store of driver specific preferences such as the driving style of the user. Upon starting the vehicle, a computing system of the vehicle may, through an adaptive rule-based system, determine that for this particular driver a trip at this time of day is unexpected or out of the ordinary. The adaptive rule-based system may use inputs such as gathered from the sensors as well as contextual information about the driving conditions and the driver himself to determine a location where a navigation element may be displayed to the driver. Since the trip is unexpected or out of the ordinary for the particular driver based on the data, the adaptive rule-based system may determine that a display located nearest the driver is well-suited for the navigation element so the driver may input a destination. A system that may perform such operations is described with respect to FIG. 2.

Figure 2:
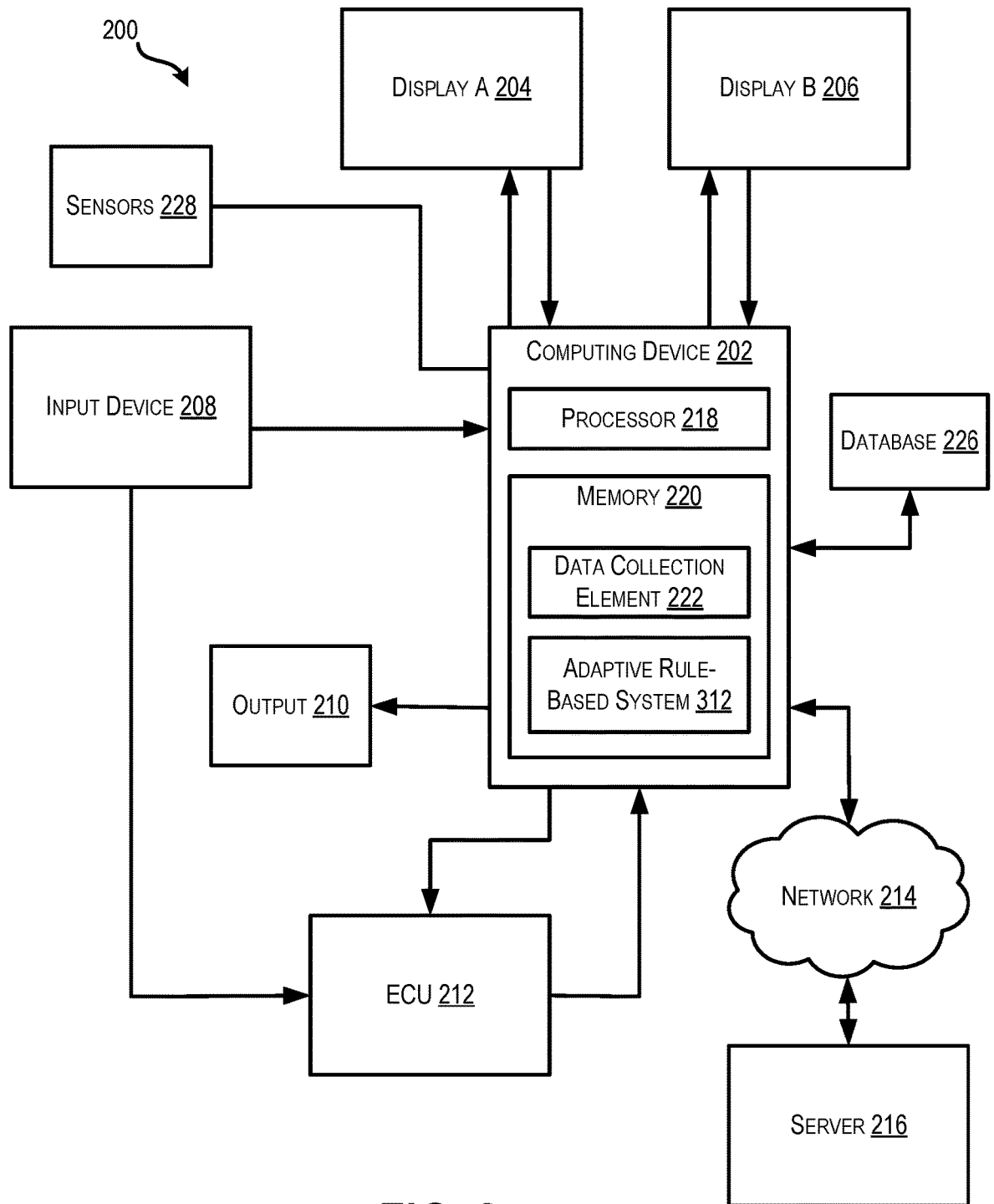
FIG. 2 illustrates a simplified block diagram depicting a computing system of a vehicle for implementing techniques herein, according to some embodiments.

FIG. 2 illustrates a simplified block diagram depicting a vehicle system 200, for example of the vehicle shown in FIG. 1, for implementing techniques herein, according to some embodiments. The vehicle system 200 includes a computing device 202 that may control some or all of the functions of the vehicle. The computing device 202 may communicate over a network 214 with a server 216 that may perform some or all of the functionality described herein. For example, the computing device 202 may include a processor 218 and a memory 220. The processor 218 and memory 220 are in communication with the other elements of the vehicle system and are capable of performing the methods described below with respect to FIG. 5. There may be multiple processors or memory devices associated with the vehicle system 200, though only one is shown in FIG. 2. The memory 220 includes a data collection element 222 and an adaptive rule-based system 312 described in further detail below with respect to FIG. 3. The data collection element 222 may gather data, such as the data gathered by the sensors 228 or data acquired from server 216 or even from a user device in communication with the vehicle system 200. In some cases, the computing device 202 and the server 216 work in tandem to perform various operations for the vehicle, for example, some processes may be carried out by the processor 218 while others are carried out on the server 216. The computing device 202 may be any suitable device that can receive and process data. Examples of computing devices are described below with respect to computing device 600 of FIG. 6 and may include access devices, transport computers, processing network computers, or authorization computers. The computing device 202 may include a memory 220, any suitable device or devices that can store electronic data. A suitable memory 220 may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation. The computing device 202 may further include a processor 218, which may refer to any suitable data computation device or devices. A processor 218 may comprise one or more microprocessors working together to accomplish a desired function. The processor may include a CPU comprising at least one high-speed data processor adequate to execute program components for executing user and/or system-generated requests. The CPU may also be a microprocessor in some examples.

The data collection element 222 may collect data as described above and store it on the memory 220 or in a database 226 which may be part of the memory 220 or may be separate from the memory 220. Historical data may be stored on the database describing previous historical data that may be used as inputs to the adaptive rule-based system 312. The database 226 may be stored on a separate storage device and may also receive, through the computing device 202, data from the server 216 over network 214. Though the elements of computing device 202 are shown as single individual elements, they may include multiple elements, such as multiple processors 218 or memories 220. In addition, some or all of the functions and operations of the computing device 202 may be performed by a remote computing device, such as server 216 over network 214.

The vehicle system 200 includes display A 204 and display B 206 as two displays of a vehicle infotainment system. Display A 204 may, for example, be center display 110 as described with respect to FIG. 1. Display B 206 may, for example, be console display 112 as described with respect to FIG. 1. Additional displays may be incorporated in the vehicle system 200, such as above-dashboard display 108 and the dashboard display 106. Display A 204 and display B 206 may each have interchangeable features, features or interactive elements that may be presented on either display A 204 or display B 206. Display A 204 may be nearer or further from the driver than display B 206.

The vehicle system 200 includes an input device 208, such as the human machine interface described above. The input device 208 may be part of display A 204 or display B 206, such as a touchscreen. The input device 208 may be an analog or digital input device that provides information to the computing device 202 from the driver. While only a single input device 208 is shown, vehicle system 200 may include multiple input devices 208. For example, both display A 204 and display B 206 may be touchscreen input devices. An output 210 is also provided to provide non-visual outputs, such as audio notifications, sounds, music, entertainment, and the like.

The vehicle system 200 further includes sensors 228. The sensors 228 may relate to different elements of the vehicle, such as operational elements including sensors for brakes, the engine, transmission, and other operational features of the vehicle. The sensors 228 may also include sensors 228 included within and exterior to the vehicle cab 100. Sensors 228 may include cameras, temperature sensors, humidity sensors, electrical sensors, and other sensors configured to gather data about the driver, the vehicle status, driving conditions, or other contextual information. Data gathered about the driver can also including data gathered by sensors internal to or external of the vehicle and accessible through manufacturer applications such as FORD PASS™ by FORD MOTOR COMPANY or virtual personal assistants such as ALEXA by AMAZON. The data from the sensors 228 is conveyed to the computing device 202 for collection by the data collection element 222 and may be used as inputs for the adaptive rule-based system 312 described below. While only one element is shown for sensors 228, vehicle system 200 may include multiple sensors as described above.

An electronic control unit (ECU) 212 is also provided that may control one or more systems of the vehicle. For example, the ECU 212 may be an engine control module, powertrain control module, transmission control module, brake control module, and other such units for controlling systems of the vehicle. In some cases, the ECU 212 may be more than one ECU 212, such as multiple of the units listed above. The ECU 212 may receive signals from the computing device 202 that provide information used by the ECU 212 for controlling different systems of the vehicle. The ECU 212 may also provide information to the computing device 202 about the systems of the vehicle. This may include the operational status or other operating information about the systems of the vehicle. The ECU 212 may receive data from the sensors 228 through the computing device 202. The data from the sensors 228 may be used to monitor and adjust operation of the functional elements of the vehicle. Data from the ECU 212 is received by the data collection element 222 and may be used, as with the data from sensors 228, as inputs into the adaptive rule-based system 312.

The vehicle system 200 may include a network 214, such as the network components described below with respect to FIG. 6. The network 214 may put the computing device 202 in communication with a server 216. The server 216 may include a powerful computer or cluster of computers. For example, the server 216 can be a large mainframe, a minicomputer cluster, or a group of servers functioning as a unit. In one example, the server 216 may be a database server coupled to a Web server. A server 216 may be coupled to a database and may include any hardware, software, other logic, or combination of the preceding for servicing the requests from one or more client computers. A server 216 may comprise one or more computational apparatuses and may use any of a variety of computing structures, arrangements, and compilations for servicing the requests from one or more client computers.

The computing device 202 may be used to operate an adaptive rule-based system 312, such as an adaptive learning system described below with respect to FIG. 4. The adaptive rule-based system 312 may use a continuous data stream or, in some examples, the adaptive rule-based system 312 may be triggered based on changes in the inputs or conditions provided as inputs to the adaptive rule-based system 312. The adaptive-rule based system 312 may rely on statistical learning methods to trigger application of the adaptive rule-based system 312 to process only the most current data gathered. In some examples, a change in trip status or a change in traffic conditions may prompt an action by the adaptive rule-based system 312. In some examples, the adaptive rule-based system may operate continually or at set intervals, such as every few second, every few minutes, or any other suitable period of time. The adaptive rule-based system 312 may be an adaptive learning system. An adaptive learning system is type of machine learning model intended to simulate the human brain and nervous system. Generally, an adaptive learning system represents a network of interconnected nodes, similar to a biological adaptive learning system, where knowledge about the nodes is shared across output nodes and knowledge specific to each output node is retained. Each node represents a piece of information. Knowledge can be exchanged through node-to-node interconnections and node-to-task connections. Input to the adaptive learning system activates a set of nodes. In turn, this set of node activates other nodes, thereby propagating knowledge about the input. At each set of nodes, transformative functions may be applied to the data. This activation process is repeated across other nodes until an output node is selected and activated. A convolution adaptive learning system (CNN) is a type of adaptive learning system that can exploit the spatial structure of data (e.g. audio files) to classify the data. To do this, a CNN may include one or more of a convolutional layer, a fully connected layer, and a pooling layer.

The vehicle system 200 described above, and especially the computing device 202, may be used herein to enhance the usability, convenience, and ease of use of the infotainment system by contextually switching or changing the location of different interactive elements on the display system of the vehicle. The adaptive rule-based system described herein identifies the relative importance of different interactive elements based on the state of the driver, driving context, and historical driver information. Different interactive elements that are most likely needed to interact directly with may be placed or located on a display near the driver for the driver to interact with easily. Some interactive elements may be positioned at or near the windshield, in a display further away from the driver, for example to provide navigation directions without directing the focus of the driver away from the road.

Figure 3:
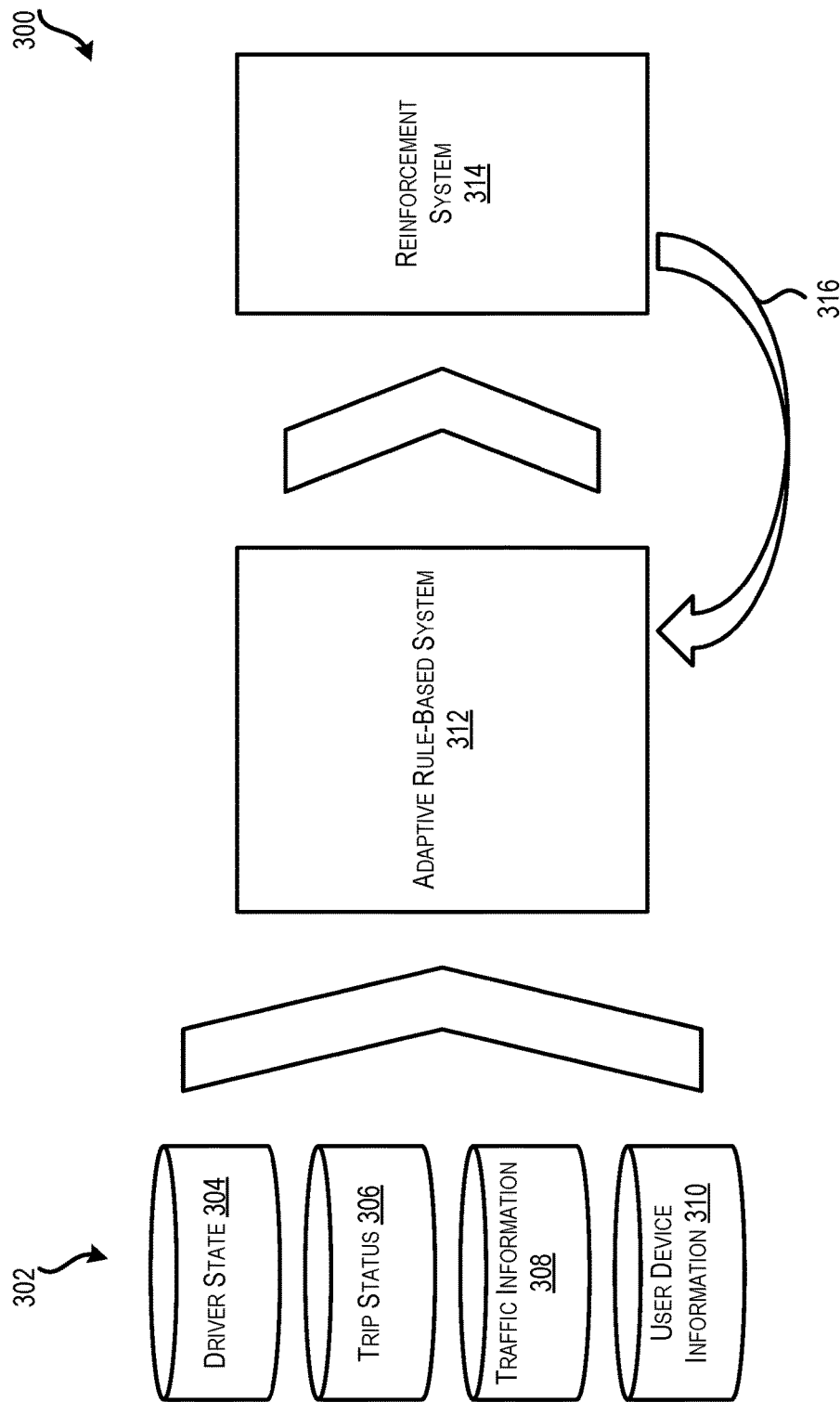
FIG. 3 illustrates a block diagram depicting an example method for implementing an adaptive rule-based system in infotainment element placement system, according to some embodiments.

FIG. 3 illustrates a block diagram depicting an example method 300 for implementing an adaptive rule-based system in infotainment element placement system, according to some embodiments. The method includes contextual data 302 such as driver, vehicle, environmental contexts and features, data describing each of these contextual features may be provided into an adaptive rule-based system of a machine learning system to determine the likelihood of interaction with a feature and the location on the display system where the feature may be positioned to ease driver interaction.

The driver state 304 may include data describing the driving style of the particular driver, the fatigue level, the stress level, or other information describing the wellbeing of the driver. This information may be stored on a memory of the computing device 202 or may be sensed or detected by sensors within the vehicle cab. For example, conductive sensors within the steering wheel 104 may detect the heart rate of the driver to detect the stress level of the driver during operation of the vehicle.

The trip status 306 may include data describing the status of a particular trip within the vehicle. The trip status 306 may include frequent trip routes and locations, cumulative trip time, trip progress, unprovoked stops, and other data related to the progress of a particular vehicular trip. This information may be gathered by a navigation system of the vehicle or of a user device associated with the driver. The navigation system or user device may store data related to frequent trips taken by the driver as well as trip progress to a particular location.

The traffic information 308 may include data describing the context outside the vehicle. The traffic information 308 may include traffic levels, speed of surrounding vehicles, weather information, and other such information. The traffic information 308 may be gathered by the computing device 202 through the network 214 or may be gathered by a user device and communicated to the computing device 202.

The user device information 310 may include data received from the user device associated with the driver. The user device information 310 may include phone status, call information, calendar information such as appointment information, trip/navigation data, and other such data. The user device may communicate with the computing device 202 over network 214 to provide this data. This communication may include connecting via Bluetooth®, USB, in-vehicle internet, Wi-Fi, or any other networks described below with respect to data network 720 of FIG. 7. The phone status, call information, calendar information, and user call history may be used to determine the likelihood of the user interacting with the user device, such as to receive a call, during operation of the vehicle. For example, the calendar information may be used to identify a previous history of using a mobile phone for a phone call during an appointment on the calendar and identify instances of upcoming appointments where a user is expected to interact with their mobile phone.

The adaptive rule-based system 312 may be a machine learning system operated by computing device 202. The adaptive rule-based system 312 may receive data and information from the contextual data 302 and use an adaptive rule-based machine learning approach to determine a location for a particular interactive element on the infotainment system. The adaptive rule-based system 312 may be used to determine where to display interactive elements within a vehicle display system. For example, the adaptive rule-based system 312 may include an adaptive learning system that receives inputs describing a driver state, such as driver identity, driver fatigue, driving style, stress level, or other such information as well as driving context information describing trip status information, trip routes, traffic conditions, weather, or other such information. The adaptive learning system may then output a location describing a location on the display system and a score associated with the location. The score may then be used to determine where an interactive element is displayed on the display system, for example by selecting the location with the highest associated score.

For example, the adaptive rule-based system 312 may determine a likelihood for taking or receiving phone calls to or from frequent contacts or infrequent contacts. In some examples, when the likelihood of receiving a phone call from a frequent contact is high, or over a predetermined threshold, the interactive element for receiving a call through a Bluetooth® device connected to the infotainment system may be moved to a display near the driver. In some examples, rules may be established based on the likelihood for the need of assistance based on route familiarity, comfort settings (such as heating and cooling), and driving at a speed slower than surrounding traffic. In some embodiments, a likelihood of infotainment changes may be based on rules established by historical user preferences such as time between changes to an audio system. In some examples, a rule may be based on the likelihood of inquiring regarding vehicle system status such as oil temperature, engine temperature, fuel level, and the like.

The reinforcement system 314 may incorporate initial rules from the adaptive rule-based system and adapt the rules or alter the rules based on observed behavior and outcomes. The initial rules may be a base set of rules for the adaptive rule-based system 312. The reinforcement system 314 may then be used to adapt the rules and adjust the adaptive rule-based system based on data from a particular vehicle. In some examples, the data may be gathered from a number of vehicles, such as a fleet of vehicles. The initial rules may be established before the system is put into practice, with example rules such as when the vehicle is driven at around twenty miles-per-hour, bringing a navigation element to a display near the natural sight line of the driver. The initial rules may acquire manual over-rides from the users and may accrue aging value to adapt to new rules, thereby adapting the rule set.

In some examples, the adaptive rule-based system 312 may be initially encoded with expert knowledge as a rule base. Experts may define rules based on inputs such as those described above or other contextual information and determine outcomes as executable actions. This rule base need not be exhaustive as the reinforcement system 314 can adapt the initial rule base based on data and outcomes in various contexts and environments as the adaptive rule-based system is further refined and learned. In some examples, the rule base may be fully exhausted, with particular partitions within the layers of the adaptive rule-based system for each contextual feature and set outcomes for each of the different contexts experienced.

The reinforcement system 314 may adapt the rule-base based on subsequent observation of the outcome of different contexts. In some cases, the rule-base may be adapted by including additional outcome information and alternative outcomes that may have greater or lower probabilities.

In an example use case, upon entering the vehicle, the computing device 202 may initially start an interactive element for navigation at a display screen close to the driver for ease of operation. Upon selection of a destination and commencement of a trip, the computing device 202 may determine that the location of the navigation interactive element may move to a screen further from the driver and closer to the windshield. In some examples, the navigation element may be moved or relocated after the driver has not confirmed a location or began driving without interacting with the navigation feature. In some examples, upon driving in unfamiliar regions, the navigation feature may be brought closer to the driver to prompt the driver. In some instances, the systems described herein may query the driver whether they require navigation assistance in the unfamiliar region before moving the location of the interactive element.

In some examples, some interactive elements may be provided priority over others, for example sever vehicle system faults such as flat tire indications, check engine lights, temperature warnings, and other such warnings may be presented with priority over all other interactive elements.

Figure 4:
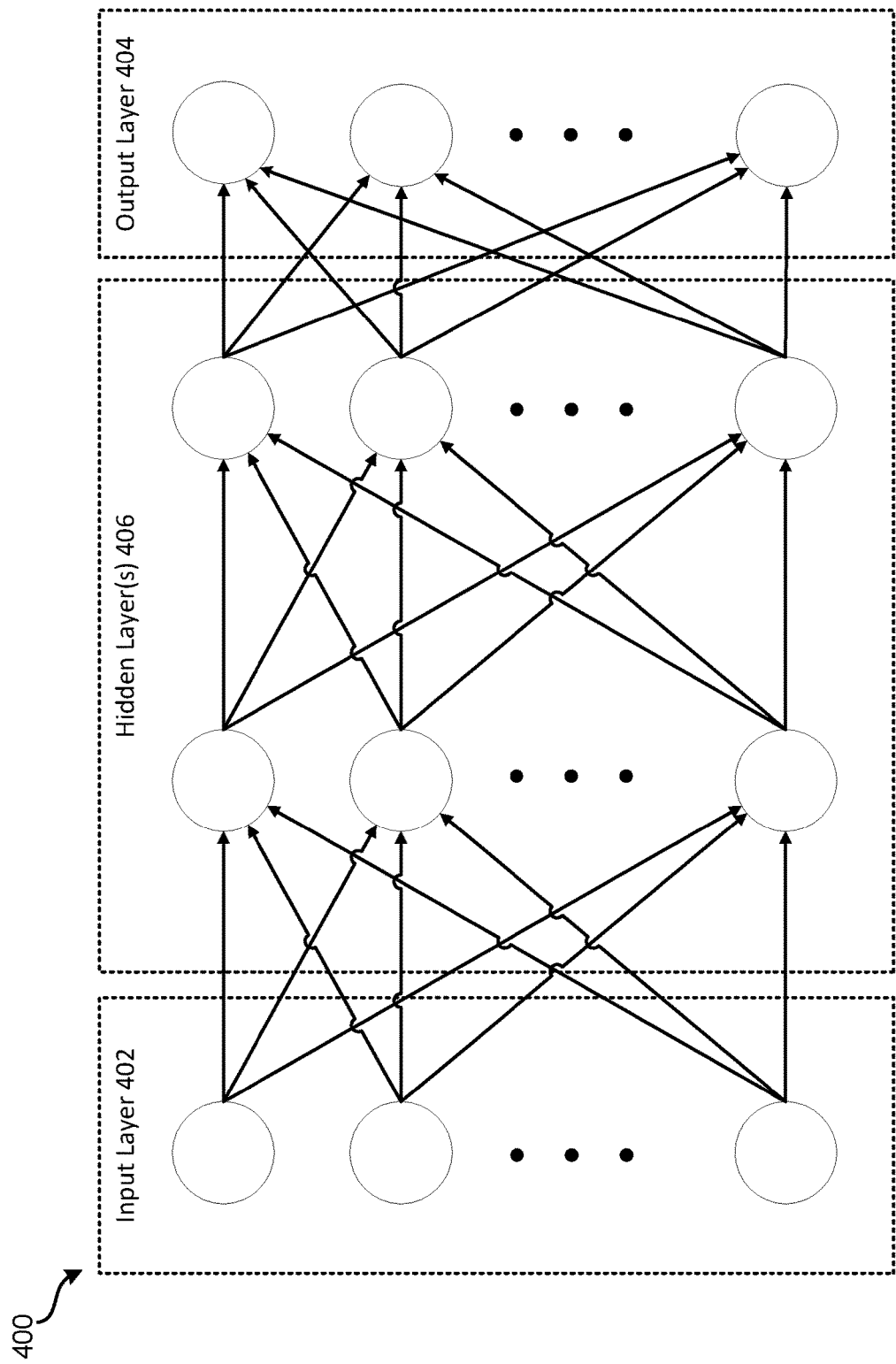
FIG. 4 illustrates a simplified model of a neural network for use in infotainment element placement, according to some embodiments.

FIG. 4 depicts an illustrative example of an overview of an adaptive learning system 400 that may be used in accordance with at least some embodiments. In particular, FIG. 4 depicts an adaptive learning system 400 type machine learning model. The adaptive learning system 400 may be an example of the adaptive rule-based system 312 of FIG. 3 described above.

As illustrated, the adaptive learning system 400 includes a series of layers, each representing a set of nodes. On one side of the series of layers exists an input layer 402. The input layer 402 includes a set of nodes that are referred to herein as input nodes. Each of these input nodes may be mapped to a particular feature of an object model or an object model itself. In some embodiments, each "feature" may actually comprise a combination of other features. For example, a feature may comprise a number of data points, a label associated with those data points (e.g., a region label), a position of the data points with respect to the rest of the object model, or any other suitable feature. For example, the input layer 402 may include input nodes associated with the inputs described above. There may be separate input nodes for driver state 304, trip status 306, traffic information 308, and user device information 310 described in FIG. 3. There may be further input nodes not listed above, including driver identity, vehicle status, and other information gathered by sensors of the vehicle or stored on a database of the vehicle computing system.

On the other side of the series of layers is an output layer 404. The output layer 404 includes a number of output nodes. Each of the output nodes may be mapped to an object model associated with a particular category of object. In some embodiments, each output node may be mapped to a region or a number of regions associated with an object model provided as input. The output layer 404 corresponds to locations on the displays of the display system. In some examples there may be output nodes for each display of a vehicle display system. In some examples there may be multiple output nodes for regions of a single display. In some examples, the output nodes may also include multiple locations as output nodes, for example when an interactive element may be presented across multiple displays, such as for vehicle emergency status information (flat tire, high engine temperature, etc.). The output nodes maybe weighted based on the probability or likelihood that a particular interactive element should be placed at any particular location. Therefore, the adaptive learning system 400 may output a list of locations with probabilities or weightings associated with each location. The interactive element may be displayed at the location or locations with the highest probability or weighting score from the adaptive learning system 400.

One or more hidden layer(s) 406 separates the input layer 402 and the output layer 404. The set of hidden layer(s) 406 includes "N" number of hidden layers, where "N" is an integer greater than or equal to one. In turn, each of the hidden layers also includes a set of nodes that are referred to herein as hidden nodes.

On one side of the hidden layer(s) 406, hidden nodes are interconnected to the input nodes. Each of the input nodes may be connected to each of the hidden nodes of the hidden layer connected to the input layer 402. On the other side of the hidden layer(s) 406, hidden nodes are connected to the output nodes. Each of the output nodes may be connected to each of the hidden nodes of the hidden layer connected to the output layer 404. In other words, each input node connects to each hidden node in the hidden layer closest to the input layer 402 and each output node connects to each hidden node in the hidden layer closest to the output layer 404. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison, a connection between a hidden node and an output node may represent a piece of information learned that is specific to the output node. The interconnection may be assigned a numeric weight that can be tuned (e.g., based on a training dataset), rendering the adaptive learning system 400 adaptive to inputs and outputs and capable of "learning."

Generally, the hidden layer(s) 406 allows knowledge about the input nodes of the input layer 402 to be shared amongst the output nodes of the output layer 404. To do so, an activation function $f$ is applied to the input nodes through the hidden layer(s) 406. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs (x, y), where $x \in X$ and $y \in Y$, a function $f:X \rightarrow Y$ is selected when such a function results in the best matches (e.g., the best representations of actual correlation data).

The adaptive learning system 400 may also use one or more functions to find an optimal solution (e.g., a solution with the highest probability or weighting). The optimal solution represents the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the adaptive learning system 400. Using a backpropagation algorithm, the output values are compared with a correct answer to compute the value of some predefined error-function. By various techniques, the error is then fed back through the network. Using this information, the algorithm may adjust the weights of each connection in order to reduce the value of the error function by some small amount. In some embodiments, the adaptive learning system 400 may be an autoencoder adaptive learning system, in which both inputs and outputs are provided to the adaptive learning system during training and the autoencoder learns to reconstruct its inputs.

In the depicted adaptive learning system 400, a forecasting model may be generated such that the hidden layer(s) 406 retains information (e.g., specific variable values and/or transformative functions) for a set of input values and output values used to train the adaptive learning system 400. This retained information may be applied to a new contextual data, such as the contextual data 302, in order to identify a likelihood of a particular outcome, the particular outcome representing the likelihood of driver interaction with an interactive element. In some embodiments, the adaptive learning system 400 may be trained on samples of historical driver data having known outcomes.

By way of illustration, an adaptive learning system as depicted in FIG. 4 may be trained using both known historical driver outcome data and context data as inputs. Each of the output nodes in this example may represent results positioned within a hyperspace. When a new contextual dataset is presented as input to the trained adaptive learning system, the adaptive learning system will output a result which can be assessed based on its position within the hyperspace.

In various examples, the computer processing of a machine learning technique such as described above can include logistic regression, multiple linear regression (MLR), dimension reduction, partial least squares (PLS) regression, principal component regression, autoencoders, variational autoencoders, singular value decomposition, Fourier bases, wavelets, discriminant analysis, support vector machine, decision tree, classification and regression trees (CART), tree-based methods, random forest, gradient boost tree, logistic regression, matrix factorization, multidimensional scaling (MDS), dimensionality reduction methods, t-distributed stochastic neighbor embedding (t-SNE), multilayer perceptron (MLP), network clustering, neuro-fuzzy, adaptive learning systems (shallow and deep), artificial neural networks, Pearson product-moment correlation coefficient, Spearman's rank correlation coefficient, Kendall tau rank correlation coefficient, or any combination thereof.

In some examples, the adaptive learning system of FIG. 4 may include or be replaced by a fuzzy rule-based system where rules can be extracted or determined by experts and then quantified using fuzzy logic. The fuzzy rule-based system includes a rule base including rules for decision-making, including IF-THEN rules with certain predetermined conditions and boundaries based on expert rule setting. The fuzzy rule-based system also includes a database of membership functions, including the terms used in the fuzzy rules and linguistic variable of the system are defined. An inference system performs a decision-making operation to device conclusions using the given rules and facts or contextual information. The fuzzy rule-based system may include elements or variables to account for trustworthiness of the various IF-THEN rules and adapts the rules based on recursive and iterative learning to develop rules with higher levels of trustworthiness.

In operation, the fuzzy rule-based system receives input data such as the contextual data and other data described above. The data is fuzzified to obtain membership degrees to each of the terms of the fuzzy variables. The inference system applies the rules, using the knowledge base, to output variables which are defuzzified and output as results, in this case describing the rearrangement or location change (if any) for particular elements on the display.

As an example, an adaptive learning system implemented as the adaptive rule-based system 312 of FIG. 3 by the computing device 202 may receive inputs such as the driver identity, driver preferences, driver fatigue level, driving conditions, traffic conditions, trip information, and/or other such information as inputs to the input layer 402. Upon a deviation from a route, such as a navigation route or a routine route driven by the driver, the adaptive learning system may output a location for a navigation element at a display near the driver. The computing device 202 may also prompt the driver to query whether the route is planned or if navigation assistance is needed. Upon the driver entering the navigation information and beginning to follow the navigation route, the inputs to the input layer may identify the updates, specifically the use of a navigation system and that the vehicle is progressing along the planned route and the adaptive learning system may output a location at or near the windshield to aid the driver in navigation while driving the vehicle.

Figure 8A:
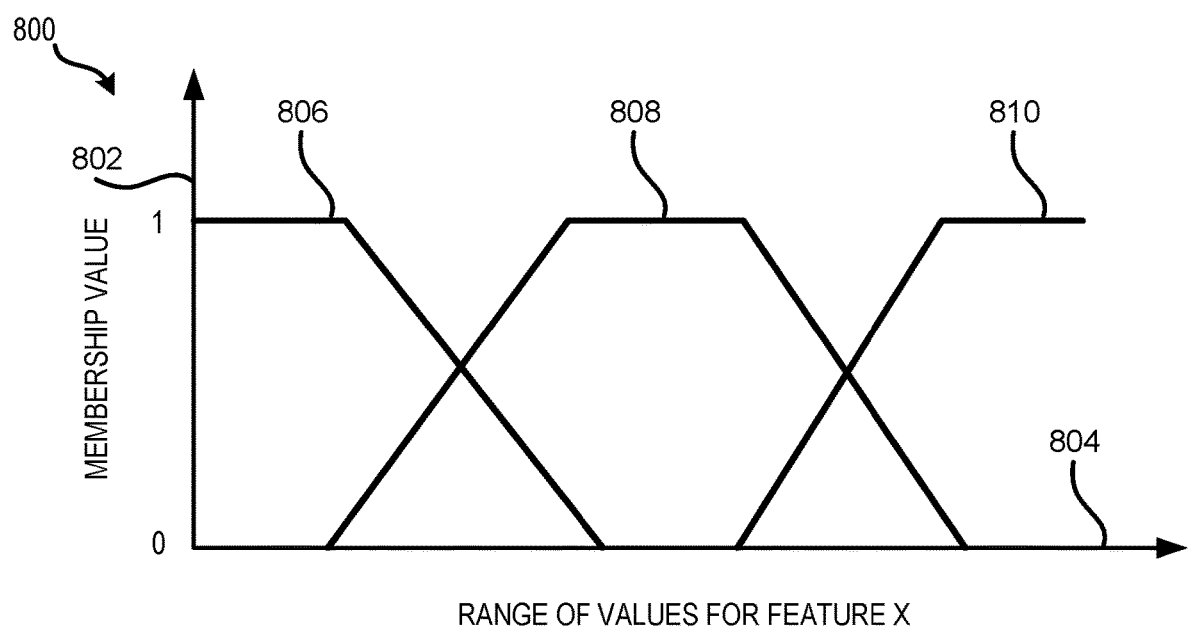
FIG. 8A illustrates a fuzzy membership function used for each input or feature, according to some embodiments.

An adaptive fuzzy rule-based system that may be used in place of the neural network of FIG. 4 in some examples. FIG. 8A illustrates a fuzzy membership function 800 used for each input or feature. The input or feature may include features such as traffic level, temperature, speed, or other contextual data described herein. The fuzzy membership function 800 is shown with a membership value 802 on the vertical (y) axis and a range of values for a particular feature 804 on the horizontal (x) axis. The membership value 802 is between a range of zero to one, with one indicating membership and zero indicating no membership. The fuzzy membership function 800 includes a set of membership functions 806, 808, 810. The set of membership functions 806, 808, 810 collectively cover the range of values for a particular feature 804. Though the fuzzy membership function 800 is shown with three membership functions, there may be greater than or fewer than three in some examples. For each input or feature with data fed into the fuzzy rule-based system, the fuzzy membership function 800 applies a membership value based on which of the membership functions 806, 808, 810 contains the data. The membership value is then output to a an adaptive rule-based system.

Figure 8B:
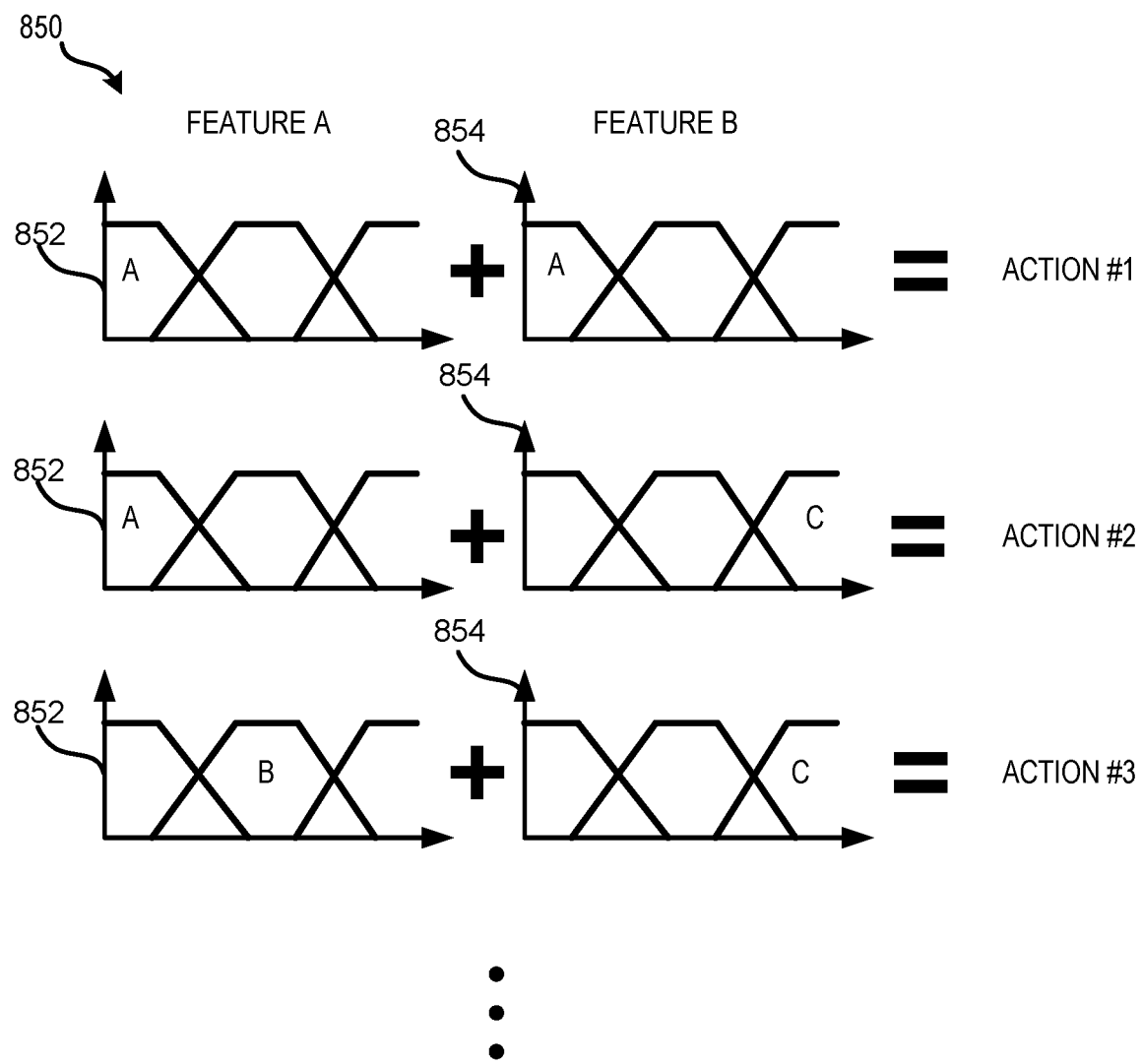
FIG. 8B illustrates an example of a fuzzy rule-based system illustrating different membership values producing different actions based on an initial set of rules for three different scenarios, according to some embodiments.

FIG. 8B illustrates an example of a fuzzy rule-based system 850 illustrating different membership values producing different actions based on an initial set of rules for three different scenarios. Feature A and Feature B may be any set of inputs or data as described herein such as driving and driver context information. In the first instance illustrated, a first membership function 852 is used to determine a membership value for Feature A, resulting in membership in A, or a low value. Feature B is likewise in a membership category of A, a low value using a second membership function 854. The combination of low Feature A and low Feature B results in Action #1, according to the initial set of rules. Similarly, in the second instance, a low value for Feature A and a high value, shown as membership in C, results in Action #2. Similarly, a mid-range membership in B and a high value or membership in C results in Action #3. These examples are intended to be illustrative only, and not limiting with respect to how the adaptive fuzzy-based rule system operates. Further, as indicated in FIG. 8B, many combinations of features may have many resulting actions not depicted, and additional features can expand the number of possible combinations.

The adaptive fuzzy rule-based system incorporates learning of actions based on previous inputs and outputs. For example, the initial rule base may establish some actions and scenarios based on expert knowledge, however some situations will not be anticipated, or may not perform exactly as intended by the initial rule base. The adaptive fuzzy rule-based system incorporates learning from observed frequencies to refine and generate additional rules, for example defining when and how to rearrange the display of a vehicle system with different display elements. The adaptation begins with the initial rule set, and possible actions or outcomes treated as mutually exclusive events. As they adaptive fuzzy rule-based system observes the frequency of different outcomes, and frequency of outcomes adjusted or selected by a user, the system conditionally learns relative frequencies. For example the system may identify a maximum outcome for a particular set of inputs, or an outcome that is more likely than other options and set or conditionally establish a rule that the particular set of inputs results in the selected output or action.

Figure 5:
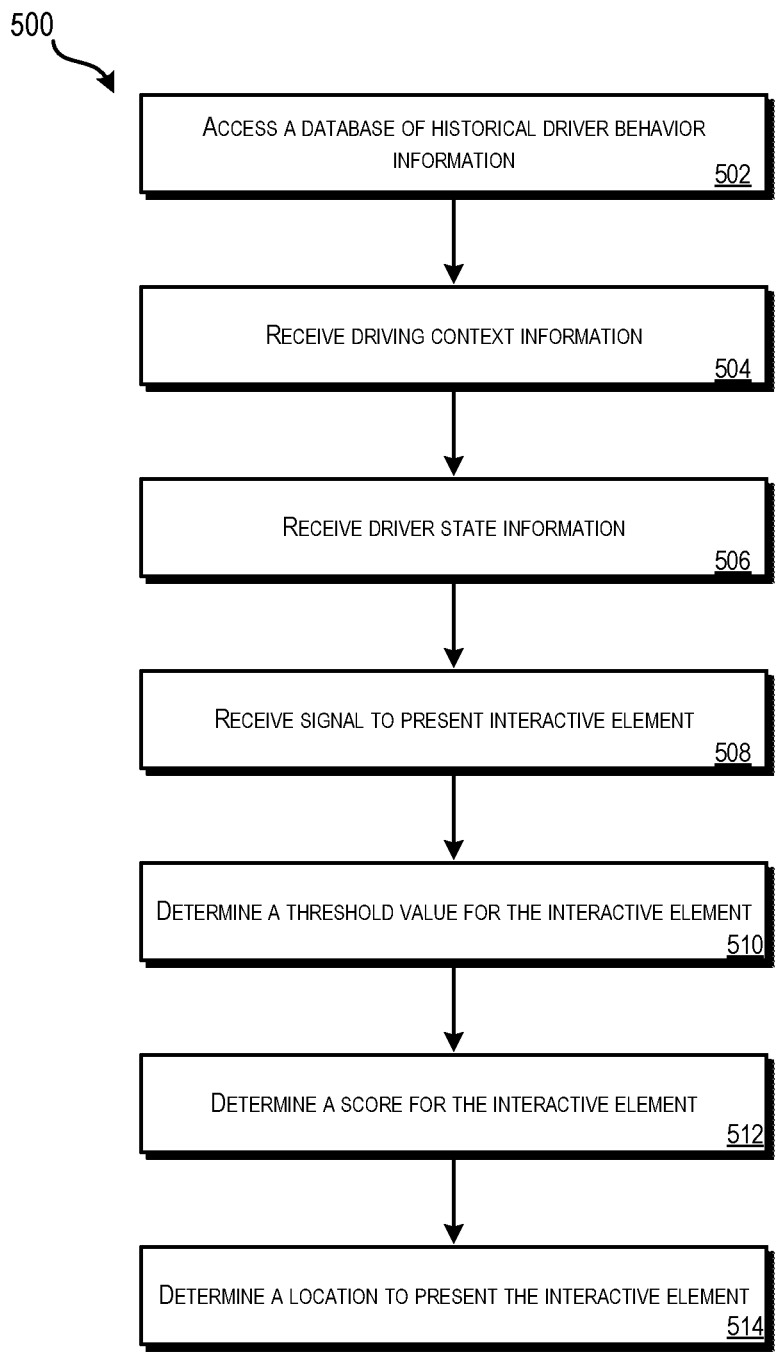
FIG. 5 illustrates a method for placing infotainment elements on a display system, according to some embodiments.

FIG. 5 illustrates a method 500 for placing infotainment elements on a display system, according to some embodiments. Method 500 may be performed by, for example, computing device 202, including server 216 as described with respect to FIG. 3. At step 502 the computing system accesses a database of historical driver behavior information. As described above, the database of historical driver behavior information may include contextual data as well as outcomes indicating the likelihood of driver interaction with interactive elements based on the contextual data. In some examples, the driver behavior information includes driver specific information based on an identified driver of a vehicle. In some examples, the driver behavior information may include generic or non-specific historical information. The driver behavior information may define the driver's preferences with respect to infotainment systems including the frequency of adjusting audio and comfort settings as well as navigation elements and user device information. The driver behavior information may be stored in a memory of the computing device or may be stored at a remote server or cloud storage database.

At step 504, the computing system receives driving context information. The driving context information may define traffic conditions, speed of surrounding vehicles, and weather information. The driving context information may be received from a remote computing device providing up-to-date information regarding the driving environment. The driving context information may include the traffic information 308 from FIG. 3 described above.

At step 506, the computing system receives driver state information. The driver state information may be the driver state 304 described above with respect to FIG. 3. The driver state information may likewise be stored on a memory device or received from a server, such as the server 216.

At step 508, the computing system receives a signal indicating a significant change in at least one contextual dataset to present an interactive element. A significant change may be, for example, a change of greater than 10% of the value of the signal. In some embodiments that use recursions, the signals may be processed at a predefined rate (e.g., 1 second). In some instances the signal may be provided by the startup of a vehicle. In some embodiments the signal may be provided by a user initiating an action. In some instances, changes in the contextual data, such as the driver state information and the driving context information may result in the signal being generated and prompting the computing system to generate and/or receive a signal. As an example, a change in the weather or a change in the trip status or progress of the trip may cause the signal to be generated.

At step 510, the computing system determines a threshold value for the interactive element. The threshold value may be determined at step 510 by the adaptive rule-based system 312 described above. For example, the adaptive rule-based system 312 may output various locations and associated weightings but only select locations and weightings based on the weighting exceeding the predetermined threshold. In some examples, the computing system may balance the threshold value against a minimum residence time in a particular location, for example, the computer system may determine an element should be placed in a certain location and the system may include a minimum time that must elapse before the element may be moved by the system without input by the user. Such a minimum residence time may reduce or eliminate too frequent of changes and/or flickering of the elements on the display screen. In some instances, the threshold value may be predetermined by a set of predefined rules. For example, the score output at step 512 below may be between 0 and 1 indicating a probability of an outcome for the interactive element, for example the probability of the driver interacting with the interactive element. The threshold may be set between 0 and 1 in the example above, for example at or above 0.5 such that a score providing a greater than fifty percent chance of an outcome would exceed the threshold. Upon the adaptive rule-based system 312 identifying a score exceeding the threshold with an output, the interactive element may be placed at the associated location.

At step 512, the computing system determines a score or weighting for the interactive element at a particular location. The score may identify a likelihood of the interactive element being located at the associated location. For example, given three displays in a vehicle cab, the adaptive rule-based system may output a score for each of the displays based on the likelihood of placement or interaction at each. The location or display having the highest score or likelihood may then be selected and caused to display the interactive element. Step 512 is performed by an adaptive rule-based system as described above. For example, the adaptive rule-based system may be an adaptive learning system 400 as described above. The adaptive rule-based system may receive context data as described above and through the processing of the adaptive rule-based system, output a score representing a probability of an outcome, especially the driver interacting with the interactive element. The score may be a numeral representative of a probability or other such indication of a likelihood of interaction.

At step 514, the computing system determines a location to present the interactive element based on the score from step 512. The location may be based on the type of interactive element, the type of interaction with the element, and the score from step 512. For example an interactive element that requires a user to type or input information such as a location may be placed in a location on a display near the driver for ease of access for the driver. The type of interaction required may refer to whether information is directly input by a user, passively observed, or otherwise interacted with. Navigation directions, for example, do not require active interaction or input but may require passive observation of the directions while changing settings for systems of the vehicle require inputs and may therefore be near the driver for convenience. A higher score from step 512 results in a greater likelihood that the interactive element is placed at the preferred location based on the type of interaction or the like. The location may, in some examples, be based on a determination that a passenger may assist a driver with a particular interactive element. The passenger may, for example, assist with inputting a destination into a navigation system while the driver is operating the vehicle. The location of the interactive element may be determined, in such cases, to be in a region of a monitor near the passenger, or a monitor or computing device in communication with the vehicle infotainment system. In some examples this may include various infotainment screens positioned around the cab of the vehicle as well as mobile devices connected or communicatively coupled to the vehicle infotainment system.

In some embodiments, the method 500 further includes providing a signal to present the interactive element at the location on the display system of the vehicle infotainment system at the location determined in step 514.

Any suitable computing system or group of computing systems can be used for performing the operations or methods described herein. For example, FIG. 7 illustrates a cloud computing system 700 by which at least a portion of the functionality of server 216 may be offered. FIG. 6 depicts an example of a computing device 600 that may be at least a portion of computing device 202 and/or server 216. In an embodiment, a single vehicle computing device 202 or server 216 having devices similar to those depicted in FIG. 6 (e.g., a processor, a memory, etc.) combines the one or more operations and data stores depicted as separate subsystems herein.

Figure 6:
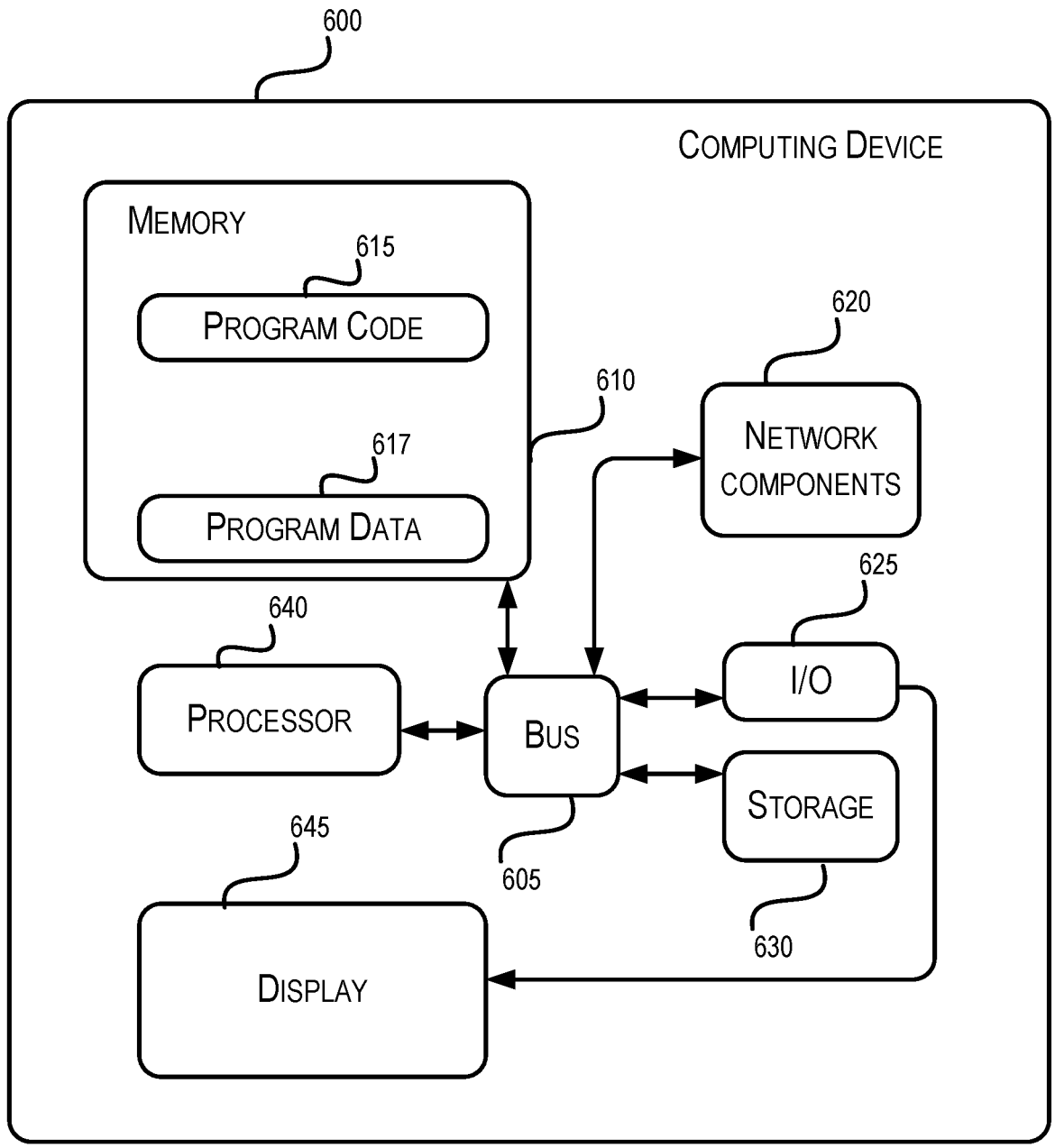
FIG. 6 illustrates a computer system, according to some embodiments.
Figure 7:
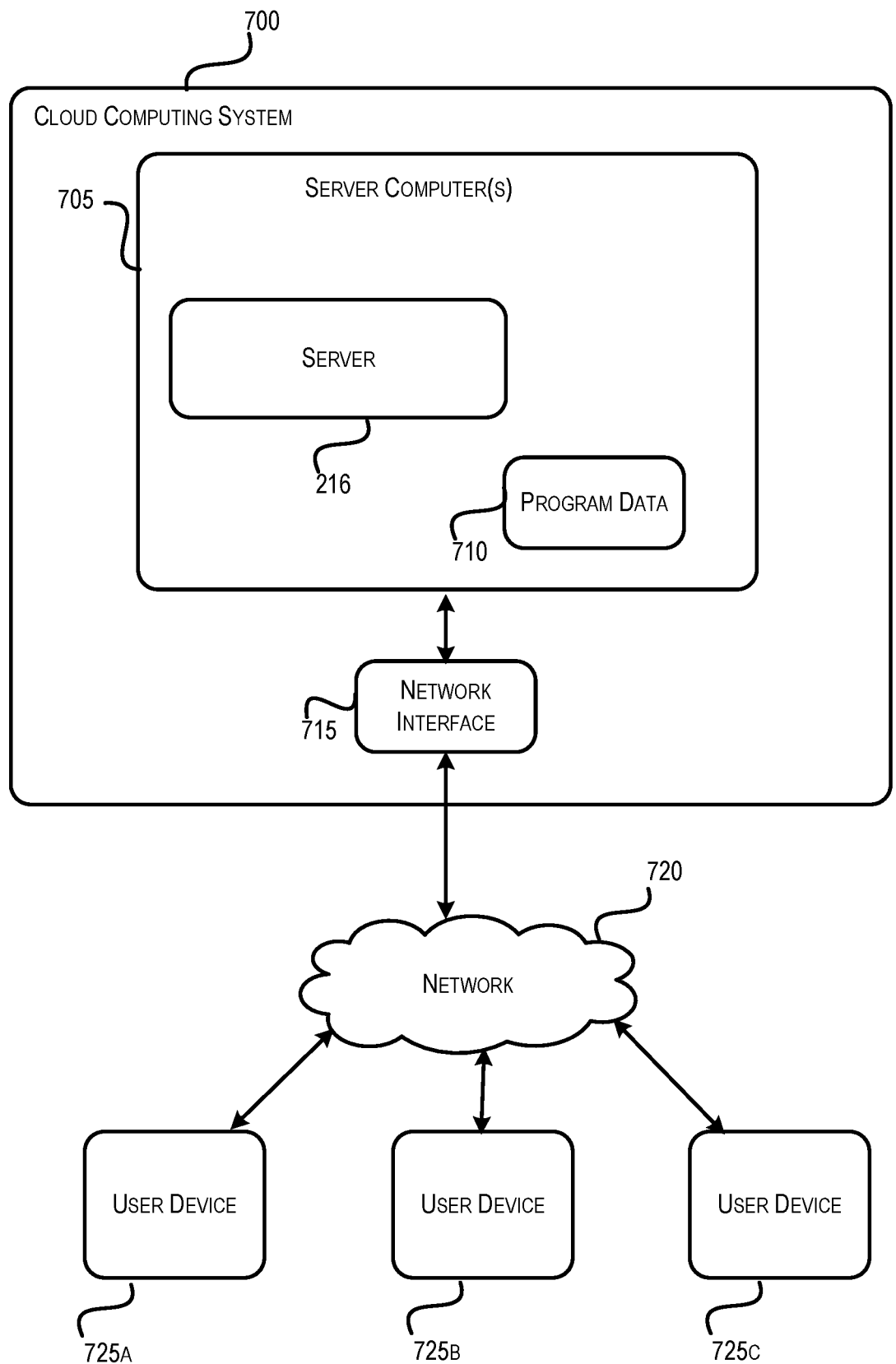
FIG. 7 illustrates a cloud computing system, according to some embodiments.

FIG. 6 illustrates a block diagram of an example of a computing device 600. Computing device 600 can be any of the described computers herein including, for example, server 216 or a computer within vehicle, such as computing device 202. The computing device 600 can be or include, for example, an integrated computer, a laptop computer, desktop computer, tablet, server, or other electronic device.

The computing device 600 can include a processor 640 interfaced with other hardware via a bus 605. A memory 610, which can include any suitable tangible (and non-transitory) computer readable medium, such as RAM, ROM, EEPROM, or the like, can embody program components (e.g., program code 615) that configure operation of the computing device 600. Memory 610 can store the program code 615, program data 617, or both. In some examples, the computing device 600 can include input/output ("I/O") interface components 625 (e.g., for interfacing with a display 645, keyboard, mouse, and the like) and additional storage 630.

The computing device 600 executes program code 615 that configures the processor 640 to perform one or more of the operations described herein. Examples of the program code 615 include, in various embodiments an adaptive rule-based system, such as the adaptive learning system of FIG. 4. The program code 615 may be resident in the memory 610 or any suitable computer-readable medium and may be executed by the processor 640 or any other suitable processor.

The computing device 600 may generate or receive program data 617 by virtue of executing the program code 615. For example, context data, traffic data, historical driver data, and other data described herein are all examples of program data 617 that may be used by the computing device 600 during execution of the program code 615.

The computing device 600 can include network components 620. Network components 620 can represent one or more of any components that facilitate a network connection. In some examples, the network components 620 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 620 can be wired and can include interfaces such as Ethernet, USB, or IEEE 1394.

Although FIG. 6 depicts one computing device 600 with a single processor 640, the system can include any number of computing devices 600 and any number of processors 640. For example, multiple computing devices 600 or multiple processors 640 can be distributed over a wired or wireless network (e.g., a Wide Area Network, Local Area Network, or the Internet). The multiple computing devices 600 or multiple processors 640 can perform any of the steps of the present disclosure individually or in coordination with one another.

In some embodiments, the functionality provided by the adaptive rule-based system 312 may be offered as cloud services by a cloud service provider. For example, FIG. 7 depicts an example of a cloud computing system 700 offering an intelligence service that can be used by a number of user subscribers using user devices 725a, 725b, and 725c across a data network 720. User devices 725a, 725b, and 725c could be examples of a vehicle 105 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 705.

The remote server computers 705 include any suitable non-transitory computer-readable medium for storing program code (e.g., server 216) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the server computers 705 execute the program data 710 that configures one or more processors of the server computers 705 to perform one or more of the operations that determine locations for interactive elements and operate the adaptive rule-based system. As depicted in the embodiment in FIG. 7, the one or more server computers 705 provide the services to perform the adaptive rule-based system via the server 216. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 720.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The server 216 is able to communicate with the user devices 725a, 725b, and 725c via the data network 720 using the network interface device 715.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A system, comprising:
   one or more processors; and
   a memory having stored thereon instructions that, when executed by the one or more processors, cause the one or more processors to:
      access a database of historical driver behavior information, the historical driver behavior information associated with a driver and describing previous interactions with a display system of a vehicle, the display system comprising a first display and a second display, wherein at least one of the first display or the second display is positioned away from a windshield of the vehicle;
      access an initial rule base describing a plurality of rules for locating interactive elements on at least one of the first display or the second display;
      receive driving context information describing a driving environment;
      receive driver state information relating to the driver;
      receive a signal to present an interactive element on the display system;
      provide, as inputs to an adaptive learning system, the initial rule base, the driving context information and the driver state information;
      determine, by the adaptive learning system, a threshold value for the interactive element based on a likelihood of access of the interactive element by the driver;
      determine, by the adaptive learning system, a plurality of scores for the interactive element at a plurality of locations on different screens of the display system based on the initial rule base, the historical driver behavior information, the driving context information, and the driver state information;
      determine, by the adaptive learning system, a first location on the first display to present the interactive element based on a determination that a first score of the plurality of scores associated with the first location exceeds the threshold value;
      determine a minimum display time for the interactive element during which the interactive element is prevented from being moved to a different location of the display system;
      display the interactive element at the first location;
      maintain, by the adaptive learning system, the interactive element at the first location for at least the minimum display time before allowing the interactive element to be moved by the adaptive learning system to a different location of the display system;
      receive, by the adaptive learning system, user interaction data describing a user interaction with the interactive element after displaying the interactive element at the first location for the minimum display time; and
      adjust one or more rules of the initial rule base in response to the user interaction data to generate an adjusted rule base.

2. The system of claim 1, wherein the instructions comprise further instructions that, when executed by the one or more processors, cause the one or more processors to:
   receive interaction type data associated with the interactive element describing a required user input for interacting with the interactive element; and
   wherein:
      the threshold value is based on the interaction type data; and
      the first location on the first display or the second display is further based on the interaction type data.

3. The system of claim 1, wherein the first score for the interactive element describes a likelihood of placing the interactive element on the display system.

4. The system of claim 1, wherein the driver state information is gathered by sensors in a cab of the vehicle.

5. The system of claim 1, wherein determining the location comprises setting the location of the interactive element to the first display based on accessibility of driver interaction with the display system based on a determination that the first score for the interactive element exceeds the threshold value.

6. The system of claim 1, wherein the driving context information is received from a remote computing device.

7. The system of claim 1, wherein the driver state information comprises data corresponding to at least one of:
   a driving style of the driver;
   a driver identity; or
   driver fatigue.

8. The system of claim 1, wherein the driver state information comprises data received from a mobile device associated with the driver.

9. The system of claim 8, wherein the data received from the mobile device comprises at least one of:
appointment information; or
phone call information.

10. The system of claim 1, wherein the instructions comprise further instructions that, when executed by the one or more processors, cause the one or more processors to determine a second location on the second display to present the interactive element based on a determination that a passenger will assist the driver with the interactive element.

11. The system of claim 1, wherein the instructions comprise further instructions that, when executed by the one or more processors, cause the one or more processors to:
receive a signal to present a subsequent interactive element on the display system;
provide, as inputs to the adaptive learning system, the adjusted rule base, subsequent driving context information, and subsequent driver state information;
determine, by the adaptive learning system, a subsequent threshold value for the subsequent interactive element based on a likelihood of access of the subsequent interactive element by the driver;
determine, by the adaptive learning system, a second plurality of scores for the subsequent interactive element at the plurality of locations within the display system based on the adjusted rule base, the historical driver behavior information, the subsequent driving context information, and the subsequent driver state information, wherein the second plurality of scores is different than a third plurality of scores that would be produced for the subsequent interactive element using the initial rule base;
determine, by the adaptive learning system, a second location on the first display to present the subsequent interactive element based on a determination that a second score of the plurality of scores associated with the second location exceeds the subsequent threshold value; and
display the subsequent interactive element at the second location.

12. The system of claim 1, wherein the instructions comprise further instructions that, when executed by the one or more processors, cause the one or more processors to:
receive interaction data from each vehicle in a fleet of vehicle systems; and
adjust one or more rules of the initial rule base in response to the interaction data.

13. A computer-implemented method, comprising:
accessing a database of historical driver behavior information, the historical driver behavior information associated with a driver and describing previous interactions with a display system of a vehicle, the display system comprising a first display and a second display, wherein at least one of the first display or the second display is positioned away from a windshield of the vehicle;
accessing an initial rule base describing a plurality of rules for locating interactive elements on at least one of the first display or the second display;
receiving driving context information describing a driving environment;
receiving driver state information relating to the driver;
receiving a signal to present an interactive element on the display system;
providing, as inputs to an adaptive learning system, the initial rule base, the driving context information and the driver state information;
determining, by the adaptive learning system, a threshold value for the interactive element based on a likelihood of access of the interactive element by the driver;
determining, by the adaptive learning system, a plurality of scores for the interactive element at a plurality of locations on different screens of the display system based on the initial rule base, the historical driver behavior information, the driving context information, and the driver state information;
determining, by the adaptive learning system, a first location on the first display to present the interactive element based on a determination that a first score of the plurality of scores associated with the first location exceeds the threshold value;
determining a minimum display time for the interactive element during which the interactive element is prevented from being moved to a different location of the display system;
displaying the interactive element at the first location;
maintaining the interactive element at the first location for at least the minimum display time before allowing the interactive element by the adaptive learning system to be moved to a different location of the display system;
receiving, by the adaptive learning system, user interaction data describing a user interaction with the interactive element after displaying the interactive element at the first location for the minimum display time; and
adjusting one or more rules of the initial rule base in response to the user interaction data to generate an adjusted rule base.

14. The computer-implemented method of claim 13, further comprising:
receiving interaction type data associated with the interactive element describing a required user input for interacting with the interactive element; and
wherein:
determining the threshold value is based on the interaction type data; and
the location on the first display or the second display is further based on the interaction type data.

15. The computer-implemented method of claim 13, further comprising determining a second location on the second display to present the interactive element based on a determination that the first score for the interactive element is less than the threshold value.

16. The computer-implemented method of claim 13, wherein determining the first location comprises setting the first location of the interactive element to the first display based on accessibility of driver interaction with the display system based on a determination that the first score for the interactive element exceeds the threshold value.

17. A non-transitory, computer-readable medium comprising instructions that, when executed by one or more processors, cause the one or more processors to:
access a database of historical driver behavior information, the historical driver behavior information associated with a driver and describing previous interactions with a display system of a vehicle, the display system comprising a first display and a second display, wherein at least one of the first display or the second display is positioned away from a windshield of the vehicle;
access an initial rule base describing a plurality of rules for locating interactive elements on at least one of the first display or the second display;

receive driving context information describing a driving environment;

receive driver state information relating to the driver;

receive a signal to present an interactive element on the display system;

provide, as inputs to an adaptive learning system, the initial rule base, the driving context information and the driver state information;

determine, by the adaptive learning system, a threshold value for the interactive element based on a likelihood of access of the interactive element by the driver on each of the first display and the second display;

determine, by the adaptive learning system, a plurality of scores for the interactive element at a plurality of locations on different screens of the display system based on the initial rule base, the historical driver behavior information, the driving context information, and the driver state information;

determine, by the adaptive learning system, a first location on the first display to present the interactive element based on a determination that a first score of the plurality of scores associated with the first location exceeds the threshold value;

determine a minimum display time for the interactive element during which the interactive element is prevented from being moved by the adaptive learning system to a different location of the display system;

display the interactive element at the first location;

maintain the interactive element at the first location for at least the minimum display time before allowing the interactive element to be moved to a different location of the display system;

receive, by the adaptive learning system, user interaction data describing a user interaction with the interactive element after displaying the interactive element at the first location for the minimum display time; and adjust one or more rules of the initial rule base in response to the user interaction data to generate an adjusted rule base.

18. The non-transitory, computer-readable medium of claim 17, wherein the instructions comprise further instructions that, when executed by the one or more processors, cause the one or more processors to:

receive interaction type data associated with the interactive element describing a required user input for interacting with the interactive element; and wherein:

the threshold value is based on the interaction type data; and the location on the first display or the second display is further based on the interaction type data.

* * * * *